May 9, 1950 L. O. SOLBERG 2,507,057
REVERSIBLE AIR CIRCULATING SYSTEM
Filed July 8, 1946 4 Sheets-Sheet 1
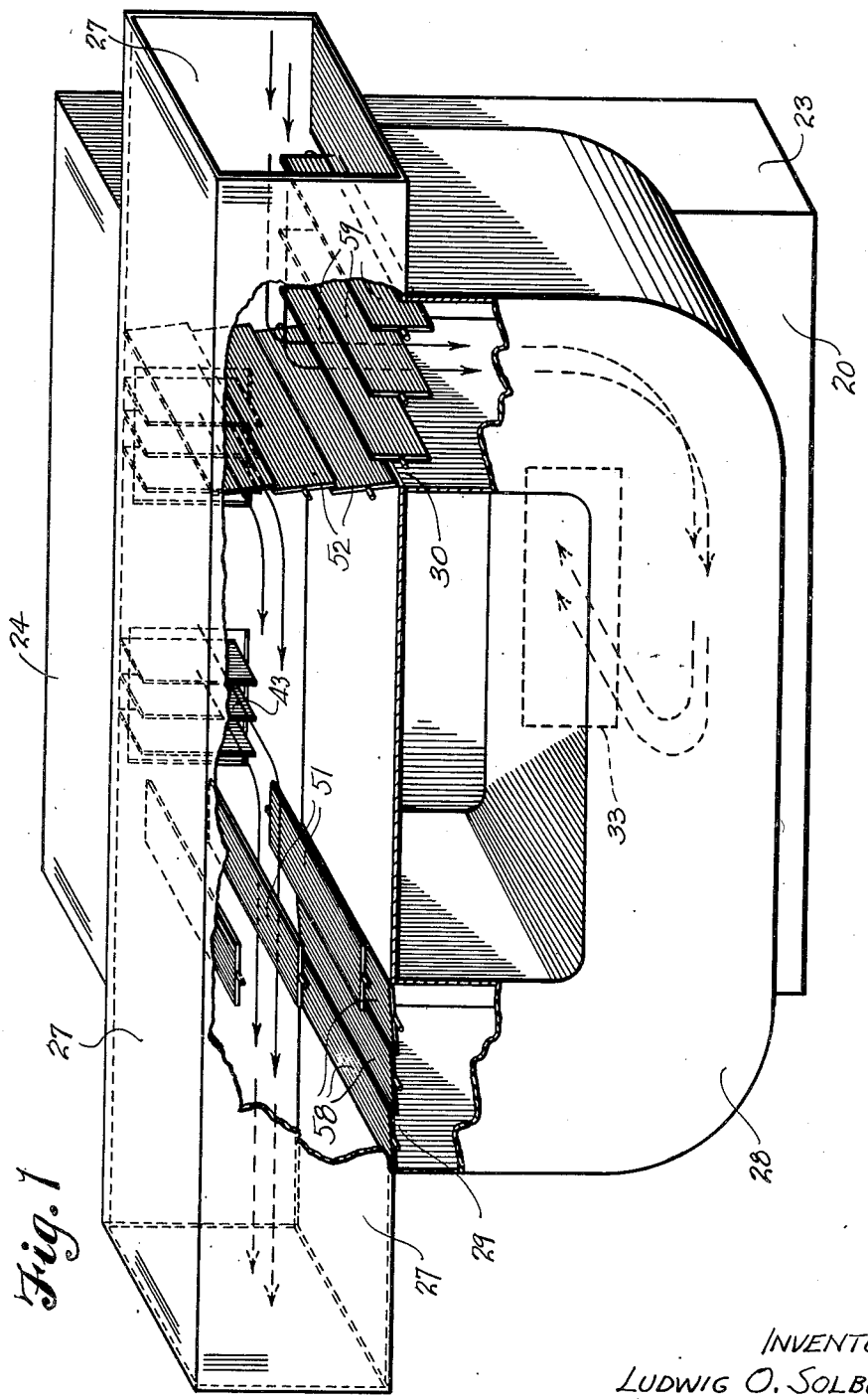
INVENTOR
LUDWIG O. SOLBERG
BY Cook & Robinson
ATTORNEYS May 9, 1950  L. O. SOLBERG  2,507,057
REVERSIBLE AIR CIRCULATING SYSTEM
Filed July 8, 1946  4 Sheets-Sheet 2
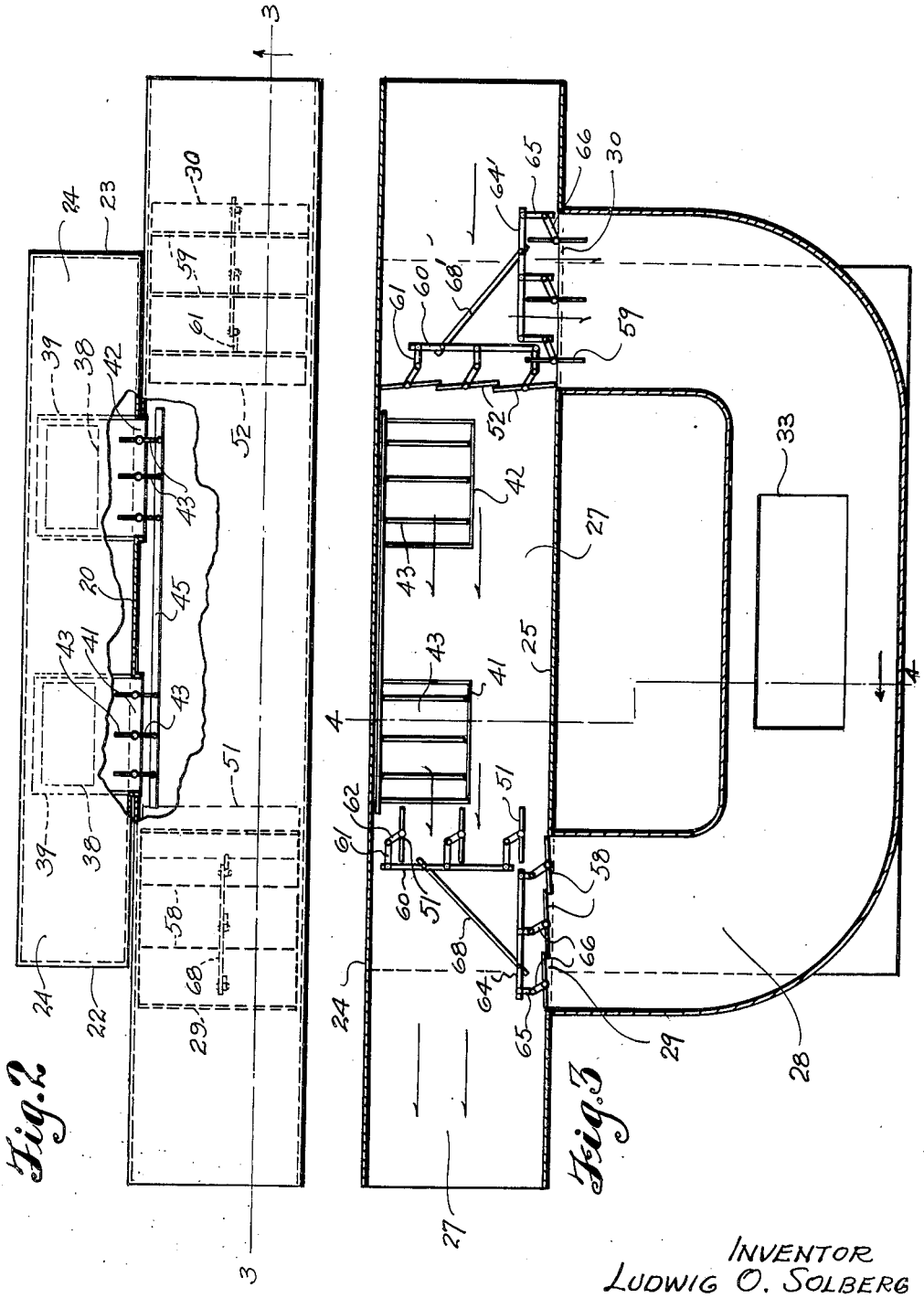
INVENTOR
LUDWIG O. SOLBERG
BY
Cook & Robinson
ATTORNEYS May 9, 1950 L. O. SOLBERG 2,507,057
REVERSIBLE AIR CIRCULATING SYSTEM
Filed July 8, 1946 4 Sheets-Sheet 3
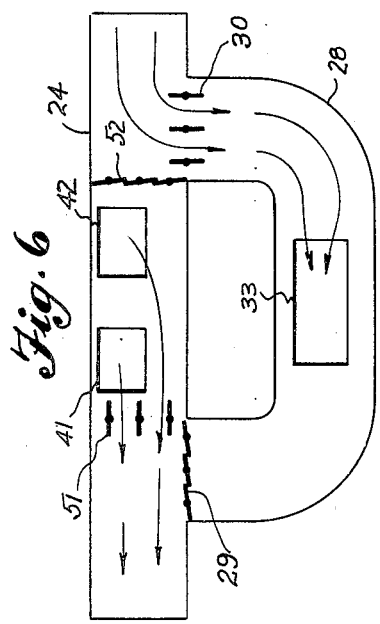
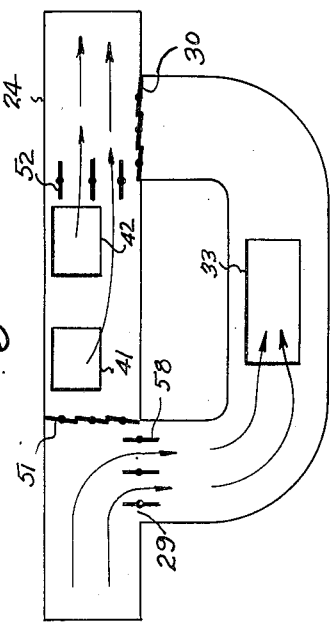
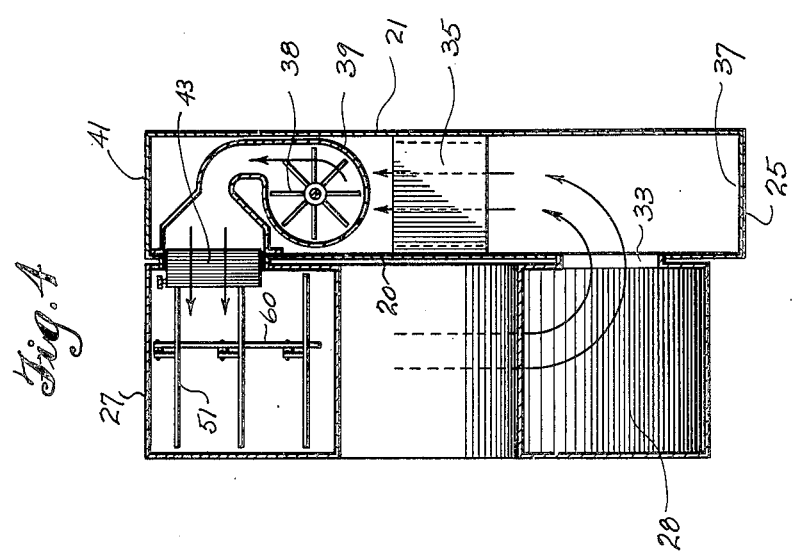
INVENTOR
LUDWIG O. SOLBERG
BY
Cook & Robinson
ATTORNEYS

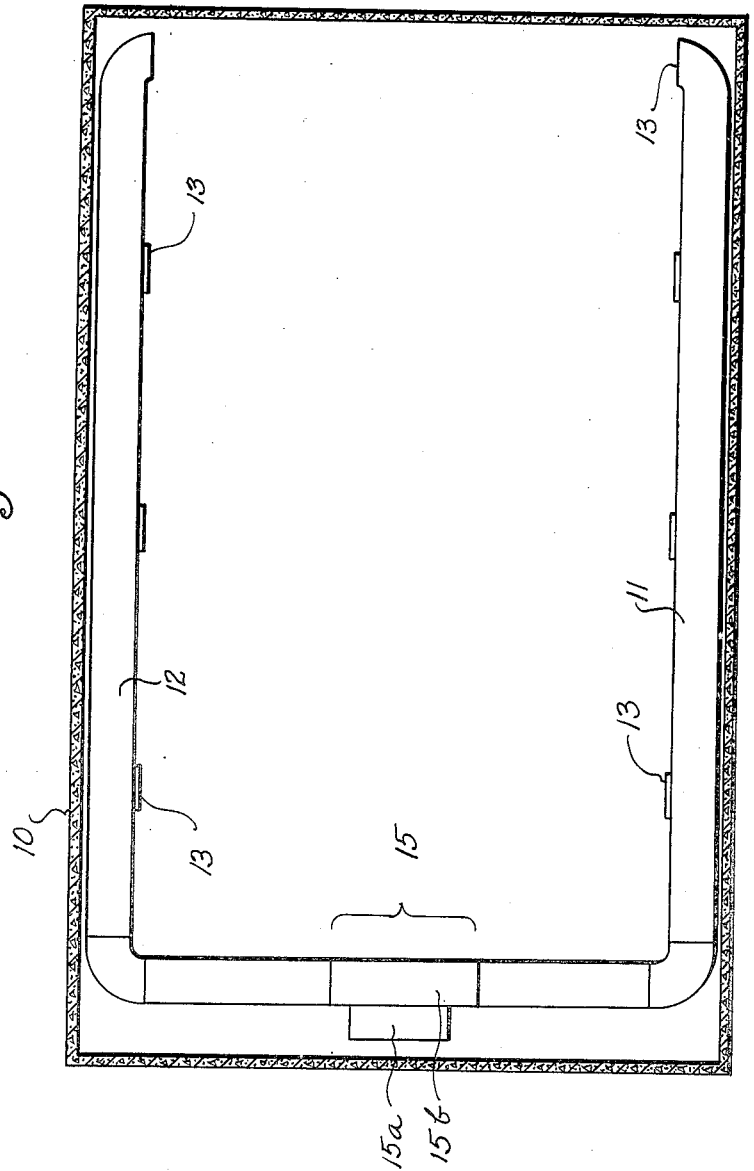

Patented May 9, 1950

2,507,057

UNITED STATES PATENT OFFICE 2,507,057

REVERSIBLE AIR CIRCULATING SYSTEM

Ludwig O. Solberg, Wenatchee, Wash.

Application July 8, 1946, Serial No. 682,007

3 Claims. (Cl. 98—33)

This invention relates to cold storage plants and systems, and it has reference more particularly to what are referred to in the particular industry to which it pertains, as reverse air refrigerating systems, wherein cooling of an enclosed area is effected by causing the air to be moved in a closed circuit through the area to be cooled and through an air cooling unit that is interposed in the said circuit. More specifically stated, the present invention has to do with improvement in means for effecting the cooling of the circulated air and means for effecting the intermittent reversal in its direction of flow in the circuit and through the area being cooled thereby.

It is the principal object of this invention to provide, as a simple, inexpensive, compact and unitary structure, an apparatus for the cooling of the circulated air stream and for the determination of its direction of flow and intermittent reversal in direction as may be desired or required.

It is also an object of this invention to provide a unitary structure of the kind above stated, that may be readily adapted to many of the already existing cold storage plants as an economical substitute for the previously used more expensive and less satisfactory systems, and which is especially desirable for use in new plants of normal capacity where it is desirable that the cooling air be periodically reversed in its direction of flow.

It is also an object of this invention to provide novel means that may be readily applied to cold storage plants using the two duct circulation system, for the intermittent reversal of direction of flow of cooling air through the cooled area, and which novel means may be readily combined with a standard air cooling apparatus to provide the present unitary structure.

Still further objects of this invention reside in the relationship and arrangement of parts embodied in the unit and in the mode of operation and use thereof, as will hereinafter be fully described.

In accomplishing these and other objects of the invention, I have provided the improved details of construction, the preferred forms of which are illustrated in the accompanying drawings, wherein:

Fig. 1 is a perspective view of an apparatus embodied by the present invention; parts of certain air ducts being broken away for better understanding.

Fig. 2 is a top, or plan view of the same, parts of the top wall of the fan housing and duct being broken away to better illustrate interior structure.

Fig. 3 is a longitudinal section of the duct and damper system taken on line 3—3 in Fig. 2.

Fig. 4 is a cross section taken on line 4—4 in Fig. 3.

Fig. 5 is a diagrammatic plan view of a cold storage plant showing the application to its two-duct system therein of an air cooling and reversing unit embodying the present invention.

Figs. 6 and 7 diagrammatically show the air direction control system and the setting of dampers for effecting flow of cooled air in reverse directions.

Referring more in detail to the drawings:

First, referring to Fig. 5, I have shown therein a rectangular enclosure 10 which encloses a room or area that is to be cooled. Such an area may be of substantial dimensions in length and width, and of suitable ceiling height. Extending along opposite sides of the enclosed area and preferably near the ceiling, are ducts 11 and 12 through which the cooling air is delivered to and from the area through openings in the ducts indicated at 13, which may be suitably baffled or dampered to cause diffusion of air streams discharged therefrom.

At one end of the area, the ducts 11 and 12 extend toward each other to a central location and there connect with the opposite ends of the present air cooling and reversing unit which, in Fig. 5, is designated in its entirety by that portion within the bracket 15. This unit embodies therein the means for cooling and propelling the air therethrough and also adjustable mechanism for determining and reversing its direction of flow to and from the ducts 11 and 12. Air that is forcibly discharged from the openings 13 of one duct will flow across the room and will be drawn into the opposite duct and returned to the cooling system embodied in the present unit. This unit will now be described.

Referring more particularly to Fig. 5, the present unit 15 is shown to comprise the air cooling and propelling section 15a and the air reversing section 15b. The section 15a, as shown best in Figs. 1 to 4, comprises a rectangular box-like housing, having opposite side walls 20 and 21, opposite end walls 22 and 23, a top wall 24 and a bottom wall 25. It is in this housing that the air cooling coils and air propelling fans are located, as will presently be explained.

The section 15b comprises an air duct 27 that extends horizontally at the level of the top wall of section 15a as seen in Fig. 1. The ends of the duct 27 extend somewhat beyond the end walls of the section 15a and there connect, respectively, with the main ducts 11 and 12, as noted in Fig. 5. Associated with the duct 27 is an auxiliary duct 28 and it is best shown in Figs. 1 and 3 that this is located directly below the duct 27 and, at its opposite ends, connects directly into the latter through substantially spaced openings as at 29 and 30. At a location intermediate its ends, the duct 28 has a side wall opening 33 of substantial dimensions providing direct communication into the lower portion of the section 15a. This opening 33 is well shown in Fig. 4, and its purpose is to admit air returned from the cooled area, into the cooling section 15a for recooling by contact with the cooling means and recirculation to the area.

The air cooling means that are located in the housing embodied by section 15a are designated in Figs. 2 and 4, by reference numeral 35. These may be of standard form and arrangement. They are located in the housing above the air inlet 33 and are so arranged that returned air, entering the lower part of housing 15a through opening 33, will be drawn upwardly therethrough for cooling. In the lower portion of the housing 15a there is embodied a basin or sump 37. Above the bank of air cooling coils 35 is a pair of fans 38—38, spaced apart in the longitudinal direction of the housing and enclosed in fan housings 39—39 which draw in the cooled air through openings in the ends of the fan housings, and discharge it into the duct 27 through openings 41 and 42 in its side wall.

By reference to Fig. 2, it will be understood that both the openings 41 and 42 open into the duct 27 within the spaced limits of the openings 29 and 30 which connect the duct 27 with the auxiliary duct 28. Mounted in the openings 41 and 42, as shown in Figs. 2 and 3, are vertically disposed dampers 43, pivoted at upper and lower ends for adjustment as required to direct the air streams, discharged from the fans, toward one or the other end of the duct 27. As noted in Fig. 2, these pivoted dampers have their forward edges pivotally connected to a rod 45 and may be adjusted in unison in one direction or the other by the shifting of this rod.

It is also shown in Figs. 2 and 3 that the openings 41 and 42, through which the cooled air enters the duct 27, are located between two spaced sets of shutter-like dampers 51 and 52 which may be adjusted between open and closed positions to determine and control the direction of discharge of the cooled air from the duct 27. These sets of dampers also are within the spaced limits of openings 29 and 30.

In Fig. 3 it is shown that the dampers 52 are closed and dampers 51 are open. Therefore the discharge of air received from the fans would be toward the left-hand end of the duct, and as understood by reference to Fig. 5, would be directed into the duct 11. If the position of the dampers 51 and 52 is reversed, then the direction of discharge of air would be reversed and would be into duct 12.

The openings 29 and 30, which are at the opposite ends of the auxiliary duct 28, are equipped with dampers 58 and 59 and these are operatively connected with the dampers 51 and 52, respectively, in such manner that when one is closed the other is open and vice versa. That is, when dampers 51 are open, for the delivery of air through duct 27 to the duct 11, the dampers 58 will be closed. But when dampers 51 are closed, then dampers 58 are open for the flow of returned air, through duct 28 to opening 33 and into the air cooling unit. Likewise the same relationship exists between dampers 52 and 59.

To effect this synchronism of adjustment between dampers, I have provided connecting linkage as seen in Fig. 3, wherein 60 designates a vertical rod with lateral arms 61 connected pivotally with levers 62 on the pivot shafts of dampers 51, and 64 designates a horizontal shaft with depending arms 65 attached pivotally to lever arms 66 on the pivot shafts of dampers 58. The rods 60 and 64 are joined pivotally by a diagonal rod 68. Thus, if rod 60 is shifted in a vertical direction, as required to open the dampers 51, the rod 68 causes a shifting of the horizontal rod 64 to close dampers 58. Likewise, when rod 60 is shifted to close dampers 51, the dampers 58 will be moved to open position. Similarly, dampers 52 have an actuating rod 60' and dampers 59 have an actuating rod 64' and these are joined by a diagonal rod 68'.

Exteriorly of the housing, the operating linkage of all dampers may be operatively connected for adjustment in unison and this would include also a connection with rod 45 so that air entering the duct 27 from the fans would be deflected by the baffles 43 toward that end of the duct that was open.

The particular advantage of this system resides in the fact that it may be made as a unitary structure and may readily be installed in cold storage plants already in use without requiring any material alterations therein; it being only necessary to connect up the ends of duct 27 with the ducts leading to the cooling area.

Such units may be made in various sizes and to meet requirements, and cooling means of any appropriate kind may be used in the compartment 15a.

Furthermore, where a satisfactory air cooling and circulating system already exists, the present air reversing equipment embodied by the structure that is herein designated in its entirety by numeral 15b, may be used therewith merely by connecting its openings 41 and 42 with the discharge outlets from the cooling unit and its opening 33 with the air inlet of the cooling unit.

Having thus described my invention, what I claim as new therein and desire to secure by Letters Patent is:

1. A reversible cooling system of the character described comprising an air cooling unit having an air intake and an outlet and including means for a forced circulation of air therethrough, a pair of distributing ducts through which the circulated air is delivered into and returned from the cooled area, and an air direction control system comprising an intermediate duct connected at its opposite ends, respectively, with the said distributing ducts, and having a cold air inlet intermediate its ends through which cooled air as discharged from the outlet of said air cooling unit is received, a by-pass duct open at its opposite ends into said intermediate duct at opposite sides of its cold air inlet and having an outlet intermediate its ends for return therethrough of air from the cooled area to the air intake of the cooling unit, dampers applied to the said by-pass duct at opposite sides of its outlet, and dampers applied to the intermediate duct between its cold air inlet and the connections of the by-pass duct therewith, and operable to control the direction of flow of cooled air through the system.

2. A reversible cooling system of the character described comprising a forced flow air cooling unit with air intake and outlet, a pair of distributing ducts alternately usable for the delivery of cooled air to a cooled area and for its return to the air cooling unit, and an air direction control system comprising an intermediate duct connected at its opposite ends, respectively, with said distributing ducts, and having at least one cold air inlet at an intermediate location for reception of the cooled air from the outlet of said air cooling unit, a by-pass duct open at its opposite ends into the intermediate duct at opposite sides of said cold air inlet, and having an outlet between its ends discharging to the intake of the air cooling unit, dampers mounted in the by-pass duct at opposite sides of its outlet, dampers mounted in the intermediate duct at opposite sides of the cold air inlet and between the inlet and the places of connection with the intermediate duct of the ends of the by-pass duct, and means interconnecting the dampers at opposite ends of the by-pass duct with dampers at corresponding ends of the intermediate duct whereby the closing of dampers at one end of the intermediate duct will cause the dampers at that end of the by-pass channel to be opened, and vice versa; and said inter-connected dampers at either side of the said outlet and inlet of the air cooling unit being adjustable to a setting reverse to the setting of connected dampers at the other side and reversible with the reversal of those at the said other side.

3. A combination as recited in claim 2 including also deflecting dampers set in the cold air inlets of the intermediate duct and adjustable to selectively deflect the incoming cool air toward one or the other end of the intermediate duct.

LUDWIG O. SOLBERG.

REFERENCES CITED

The following references are of record in the file of this patent:

UNITED STATES PATENTS

| Number | Name | Date |
|---|---|---|
| 1,954,239 | Doherty | Apr. 10, 1934 |
| 2,286,115 | Shelton | June 9, 1942 |
| 2,370,886 | Solberg | Mar. 6, 1945 |